(12) United States Patent
Tamai et al.

(10) Patent No.: US 7,543,670 B2
(45) Date of Patent: Jun. 9, 2009

(54) WHEEL SLIP CONTROL SYSTEM

(75) Inventors: Goro Tamai, West Bloomfield, MI (US);
James L. Worthing, Munith, MI (US);
Birendra P. Bhattarai, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 551 days.

(21) Appl. No.: 11/263,215

(22) Filed: Oct. 31, 2005

(65) Prior Publication Data
US 2007/0095589 A1    May 3, 2007

(51) Int. Cl.
*B60K 28/16* (2006.01)
(52) U.S. Cl. ..................... 180/197; 180/244
(58) Field of Classification Search ............ 180/197; 477/35
See application file for complete search history.

(56) References Cited

U.S. PATENT DOCUMENTS

| | | | | |
|---|---|---|---|---|
| 6,279,531 B1 * | 8/2001 | Robichaux et al. | ..... | 123/339.19 |
| 6,565,483 B2 * | 5/2003 | Segawa et al. | ..... | 477/174 |
| 7,004,018 B2 * | 2/2006 | Kadota et al. | ..... | 73/116 |
| 7,114,589 B2 * | 10/2006 | Kowatari et al. | ..... | 180/243 |
| 7,140,460 B2 * | 11/2006 | Shimizu et al. | ..... | 180/65.2 |
| 7,234,553 B2 * | 6/2007 | Shimizu et al. | ..... | 180/65.2 |
| 7,328,097 B2 * | 2/2008 | Sawada et al. | ..... | 701/70 |
| 2001/0027369 A1 * | 10/2001 | Nishida et al. | ..... | 701/89 |
| 2001/0029423 A1 * | 10/2001 | Nishida et al. | ..... | 701/89 |

FOREIGN PATENT DOCUMENTS

JP    3438243    8/2003

* cited by examiner

*Primary Examiner*—Paul N Dickson
*Assistant Examiner*—Tashiana Adams

(57) ABSTRACT

A wheel slip control system includes wheel speed sensors that generate wheel speed signals and a control module that controls torque production of at least one of an engine and an electric motor and that detects a negative wheel slip based on the wheel speed signals. The control module increases torque production of at least one of the engine and the electric motor when the negative wheel slip is detected.

20 Claims, 3 Drawing Sheets

WHEEL SLIP CONTROL SYSTEM

FIELD OF THE INVENTION

The present invention relates to vehicle control systems, and more particularly to a wheel slip control system.

BACKGROUND OF THE INVENTION

To improve fuel economy, fuel delivery to an engine in a hybrid or conventional powertrain vehicle may be deactivated during vehicle deceleration and vehicle stops. During deceleration, the engine, electric motor/generator (EMG), and air conditioner (AC) may be back driven by the vehicle wheels. When fuel delivery to the engine is deactivated, the EMG may recharge an energy storage device (ESD). The drag of the engine, EMG, and AC may result in increased negative drive-axle torque. Negative wheel slip may occur when the force required to back drive the engine, EMG, and AC becomes greater than the frictional force between the road and the driven wheels.

Positive wheel slip may occur when the operator aggressively drives the vehicle. When the vehicle is accelerated, the force of the positive drive-axle torque may become greater than the frictional force between the road and the drive wheels. In such case, positive wheel slip occurs. When aggressively driving the vehicle, the operator may disable the vehicle traction control system.

Traditionally, wheel slip is detected by the anti-lock braking system (ABS) and by the traction control system. In the traditional system, however, wheel slip is not controlled when the brakes are not applied or when the traction control system is disabled.

SUMMARY OF THE INVENTION

Accordingly, the present invention provides a wheel slip control system. The wheel slip control system includes wheel speed sensors that generate wheel speed signals. A control module controls torque production of at least one of an engine and an electric motor and detects negative wheel slip based on the wheel speed signals. The control module increases torque production of at least one of the engine and the electric motor when negative wheel slip is detected.

In one feature, the control module regulates a compressor capacity of an air conditioner, and decreases the compressor capacity when a negative wheel slip is detected.

In other features, the wheel slip control system includes a torque converter clutch slip sensor that generates a torque converter clutch slip signal and an engine rotational speed sensor that generates an engine rotational speed signal. The control module calculates axle torque based on the torque converter clutch slip signal, the engine rotational speed signal and the wheel speed signals, and increases torque production of at least one of the engine and the electric motor when the calculated axle torque is negative.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
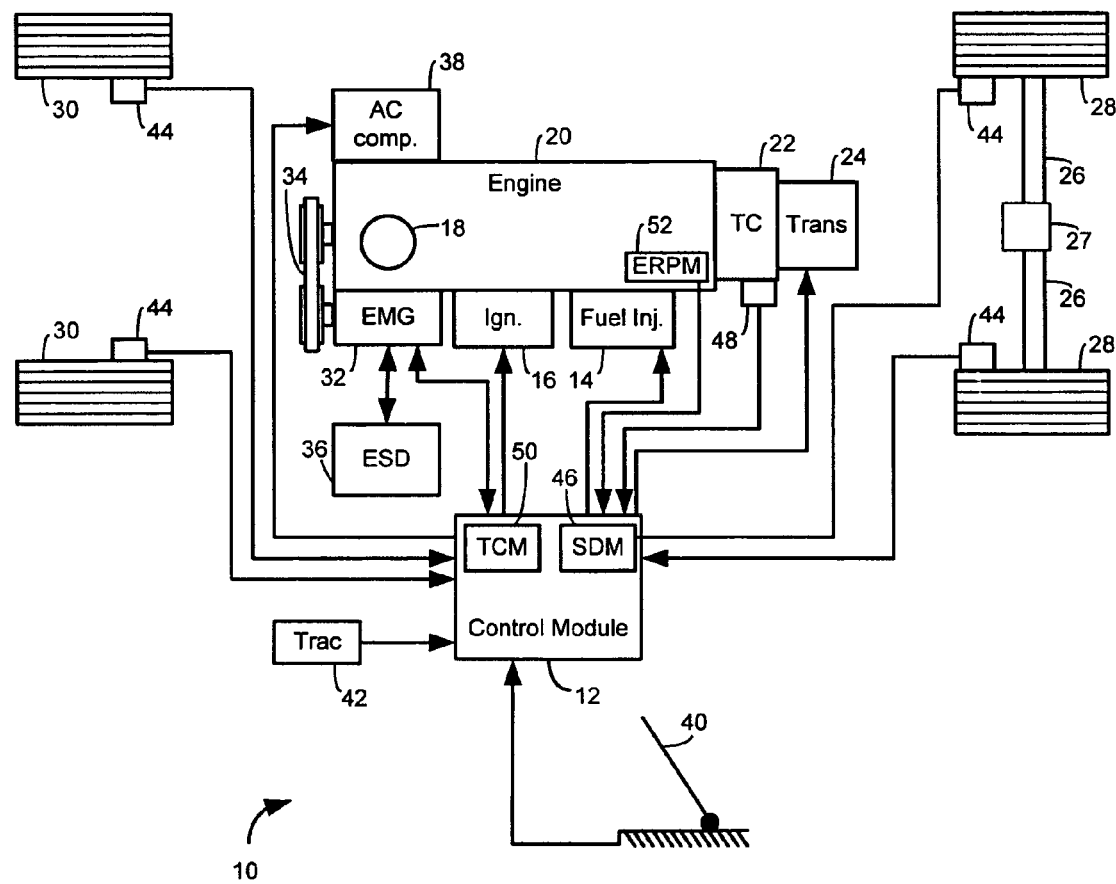
FIG. 1 is a schematic illustration of an exemplary hybrid vehicle according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a wheel slip control system 10 for a hybrid vehicle is shown. As can be appreciated, the control system 10 may also be implemented in a conventional or non-hybrid vehicle. A control module 12 controls a fuel injection system 14 with one or more fuel injectors and an ignition system 16 to selectively deliver fuel and spark to at least one cylinder 18 of an engine 20. When fuel and spark are delivered, the engine 20 produces torque which is transferred by a torque converter 22 and a transmission 24 to a differential 27 and drive-axles 26. Positive drive-axle torque drives driven wheels 28 of the vehicle. The vehicle may also include non-driven wheels 30. It is understood that the present invention may be configured with other driveline component arrangements. For example, a transaxle may be used.

The control module 12 regulates operation of an electric motor/generator (EMG) 32. The engine 20 and the EMG 32 are coupled via a belt-alternator-starter system 34. The EMG 32 may also be coupled to the engine 20 by a chain drive, a clutch system, or other device. The EMG functions as a motor by using energy stored in an energy storage device (ESD) 36 to supplement torque produced by the engine 20. The EMG 32 may also be driven by the engine 20 to function as a generator and recharge the ESD 36. In such case, the EMG 32 produces an electric current which is used to charge the ESD 36. In a conventional powertrain vehicle, torque production is not supplemented by an electric motor.

The engine 20 may drive an air conditioner (AC) compressor 38 coupled to the engine 20. The air conditioner cools the interior of the vehicle. The control module 12 controls air conditioner operation by regulating a capacity or rotational speed of the AC compressor 38.

The operator presses an accelerator pedal 40 to accelerate the vehicle. When the operator releases the accelerator pedal 40, vehicle deceleration may occur. During deceleration, the control module 12 deactivates fuel delivery to the engine 20 by deactivating fuel delivery to the at least one cylinder 18. In some implementations, deactivation is performed by activation and deactivation of intake and/or exhaust valves. When fuel delivery to the at least one cylinder 18 is deactivated, the fuel injector for the cylinder 18 is deactivated and spark is not delivered to the cylinder 18. When fuel delivery is deactivated, the engine 20 does not produce torque and may be back-driven by the wheels 28 through the transmission 24 and torque converter 22. During deceleration, the EMG 32 and AC compressor 38 may also be back driven. Negative drive-axle torque results when the engine 20, EMG 32, and AC compressor 38 are back driven by the wheels 28.

When the operator presses the accelerator pedal 40, positive drive-axle torque is increased. When the force of the positive drive-axle torque becomes greater than the frictional force between the road and the drive wheels 28, positive wheel slip may occur. The control module 12 receives a traction control signal 42, indicating whether the traction control system is enabled. The traction control system may be selectively enabled by a push button accessible to the operator. The traction control system generally controls positive wheel slip by decreasing the torque delivered to slipping wheels. The operator may disable traction control, however, to drive the vehicle aggressively. In such case the operator may intentionally induce positive wheel slip.

The control module 12 controls the ignition system 16 and fuel injection system 14 to deliver spark to the at least one cylinder of the engine 18. The control module 12 determines a point during a piston stroke to deliver spark to the cylinder 18. The control module 12 may deliver spark at an optimal point during the piston stroke to produce the maximum amount of torque. The control module 12 may also deliver spark at a point after the optimal point. When spark is delivered after the optimal point, the engine 20 produces less than the maximum amount of torque. The time interval between the optimal point and the point at which spark is delivered is the spark offset. As the spark offset increases, torque production decreases.

The control module 12 monitors wheel speed signals generated by wheel speed sensors 44 and calculates vehicle speed based on the wheel speed signals. The control module 12 includes a slip detection module (SDM) 46 that receives the wheel speed signals and that calculates wheel slip as the difference between the wheel speed of the driven wheels 28 and the wheel speed of the non-driven wheels 30. The SDM 46 determines when a positive or negative wheel slip is occurring, or about to occur. As can be appreciated, other suitable vehicle speed and wheel slip detection means may be employed to calculate vehicle speed and wheel slip.

The control module 12 monitors torque parameters to develop a model of torque production and consumption. The control module 12 receives an engine rotational speed signal (ERPM) that is generated by an engine rotational speed sensor 52 based on a rotational speed of the engine. Based on ERPM and on the state of the ignition system 16 and fuel injection system 14 (i.e., whether fuel delivery is activated or deactivated), the control module 12 determines whether the engine 20 is currently producing torque or currently being back driven. Likewise, the control module 12 determines whether the EMG 32 is currently producing torque or currently being back driven.

The control module 12 controls a current gear of the transmission 24. The gear ratio determines the amount of torque transferred between the engine 20 and the drive-axles 26.

The control module 12 controls a capacity of the AC compressor 38. The AC compressor 38 is driven by the engine. Increased capacity results in increased torque consumption by the AC compressor 38. Alternatively, the control module 12 may control a rotational speed of the AC compressor 38, wherein increased compressor rotational speed results in greater cooling by the air conditioner.

The control module 12 also monitors a torque converter clutch slip rate signal ($TCC_{Slip}$) that is generated by a torque converter clutch slip sensor 48. $TCC_{Slip}$ is the difference between ERPM and a rotational speed of an output shaft of the torque converter 22. When the engine 20 is providing torque to the transmission 24, ERPM may be greater than the rotational speed of the output shaft, resulting in a positive $TCC_{Slip}$. When the engine 20 is back-driven by the transmission 24, the rotational speed of the output shaft may be greater than ERPM, resulting in a negative $TCC_{Slip}$. Thus, the torque converter clutch slip sensor 48 may actually be composed of two sensors that monitor the input and output rotational speeds of the torque converter 22. The TCC slip sensor 48 may output the difference between the two rotational speeds. Alternatively, a TCC slip sensor 48 may be replaced with an output shaft rotational speed sensor. In such an embodiment, the control module 12 may receive an output shaft rotational speed signal, and calculate $TCC_{Slip}$ based on ERPM and the output shaft rotational speed signal.

Based on ERPM, $TCC_{Slip}$, the current transmission gear, the fuel injection system 14, the ignition system 16, the EMG 32, the AC compressor capacity, and the wheel speed signals, the control module 12 determines drive-axle torque. When the EMG 32 and/or the engine 20 are producing torque, positive drive-axle torque may result. When the EMG 32 and/or the engine 20 are not producing torque, and the EMG 32 and/or engine 20 are back-driven, negative drive-axle torque may result.

The control module 12 includes a torque control module (TCM) 50 to neutralize negative drive-axle torque. When negative wheel slip occurs due to increased negative drive-axle torque, the TCM 50 implements a torque control routine to increase the drive-axle torque. The TCM adjusts the fuel injection system 14, the ignition system 16, the EMG 32, the AC compressor 38, and the current transmission gear, to neutralize negative drive-axle torque or to create a slightly positive drive-axle torque.

Figure 2:
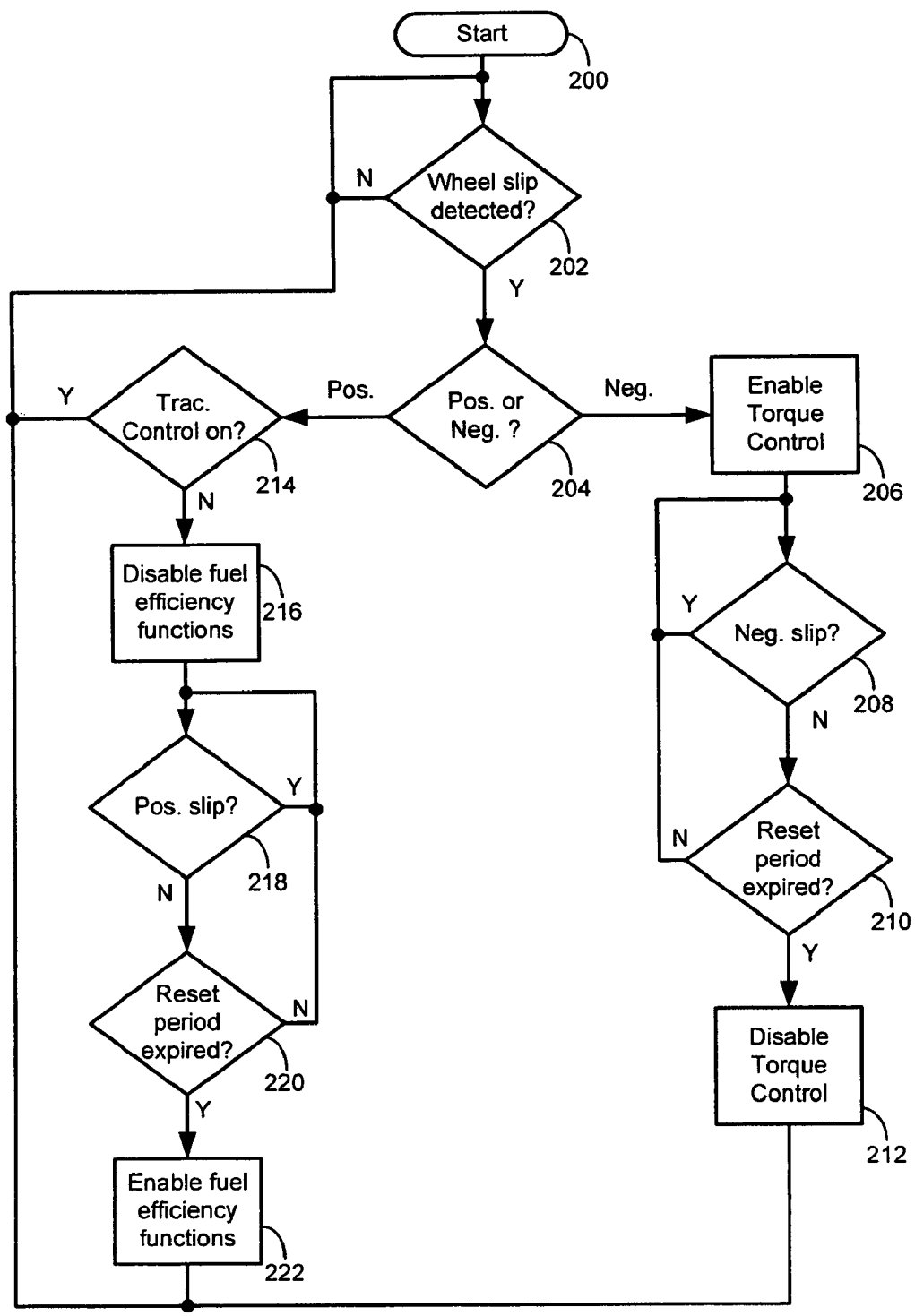
FIG. 2 is a flowchart illustrating steps performed by a wheel slip control system according to the present invention.

Referring now to FIG. 2, steps performed by the control module 12 according to the present invention are illustrated. Control begins in step 200. In step 202, control determines whether a wheel slip is detected. As discussed above, the SDM 46 monitors the wheel speed signals to detect a wheel slip. The SDM 46 may broadcast a wheel slip signal to the control module 12, including the TCM 50.

When a wheel slip is detected, control proceeds to step 204 and determines whether the wheel slip is a positive wheel slip or a negative wheel slip. When the wheel slip is a negative wheel slip, control proceeds to step 206. The negative wheel slip may be the result of increased negative drive-axle torque.

In step 206, torque control is enabled. As discussed in more detail with reference to FIG. 3 below, when torque control is enabled the TCM 50 executes a torque control routine to neutralize negative drive-axle torque. To enable torque control, a torque control enable signal is generated or a torque control enable flag is set. After enabling torque control in step 206, control proceeds to step 208.

In step 208, control determines whether negative wheel slip continues to occur. Control loops on step 208 until negative wheel slip is no longer detected. When negative wheel slip is no longer detected, control proceeds to step 210.

In step 210, control determines whether a reset period has expired. The reset period begins when negative wheel slip is no longer detected. Control loops on steps 208 and 210 until the reset period expires. When the reset period expires without the detection of additional negative wheel slip, control proceeds to step 212. When additional negative wheel slip is detected prior to the expiration of the reset period, then control loops on step 208 until the negative wheel slip is no longer detected, and the reset period is restarted. In this way, torque control is enabled until negative wheels slip has ceased for the duration of the reset period. The reset period may be a predetermined period. The reset period may also be based on the vehicle speed such that higher vehicle speeds require a shorter reset period.

In step 212, torque control is disabled. To disable torque control, the torque control enable signal or torque control enable flag may be reset. When torque control is disabled, control proceeds to step 202.

Figure 3:
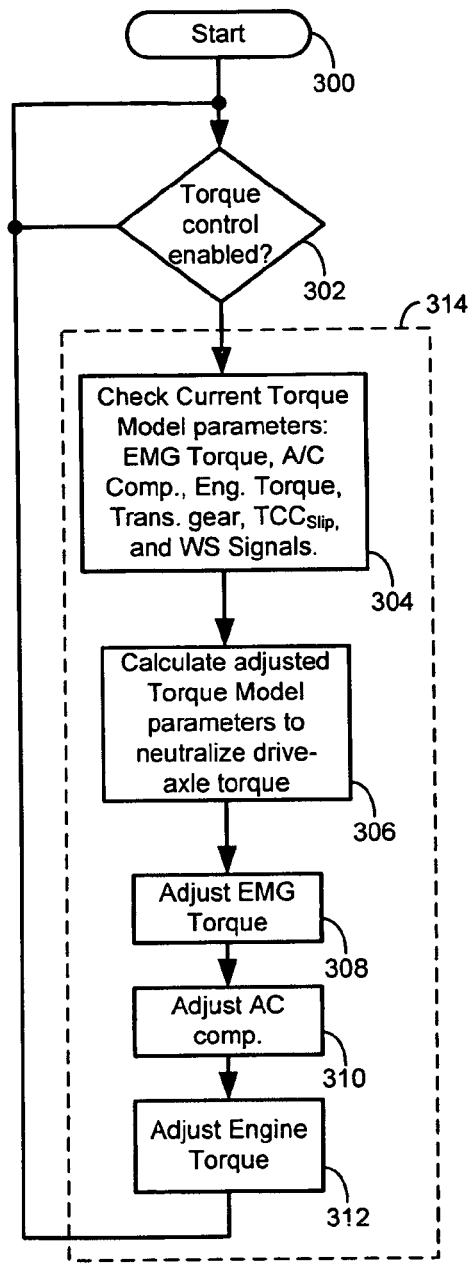
FIG. 3 is a flowchart illustrating steps performed to control torque.

Referring now to FIG. 3, steps performed by the TCM 50 according to the present invention are illustrated. Control begins in step 300. In step 302, control determines whether torque control is enabled. When torque control is enabled, control enters a torque control routine 314 and proceeds to step 304.

In step 304, control checks the current torque model parameters including the EMG 32 torque input or output, AC compressor 38 torque input, the engine 20 torque input or output, the current transmission gear, $TCC_{Slip}$, and the wheel speed signals. Based on these torque model parameters, control determines the current drive-axle torque.

In step 306, control calculates adjusted torque model parameters for neutral or slightly positive drive-axle torque. As discussed below, in steps 308, 310, and 312, control adjusts the EMG torque, AC compressor 38, and engine torque based on the calculations of step 306. After adjusting the torque parameters in steps 308, 310, and 312, control determines whether torque control remains enabled in step 302. Control continues to check current torque model parameters, calculate adjusted torque model parameters, and adjust torque model parameters, while torque control is enabled.

Initially, in a hybrid vehicle negative drive-axle torque is neutralized by increased torque produced by the EMG 32. The EMG 32 is switched from a recharging, or torque consuming, mode to a torque producing mode. A rotational speed of the EMG 32 is set at a level sufficient to create a neutral, or slightly positive, drive-axle torque based on the current $TCC_{Slip}$ and transmission gear in step 308. In a conventional powertrain vehicle, torque control is implemented by increasing engine torque production. In both cases, torque control may also include decreasing AC compressor 38 capacity or AC compressor 38 rotational speed.

On subsequent iterations of the torque control routine 314, the TCM 50 coordinates a net-zero, or slightly positive, drive-axle torque, while the EMG 32, engine 20, and AC compressor torque parameters are gradually adjusted. In this way, negative drive-axle torque is neutralized while maintaining drivability.

Fuel delivery to the engine 20 is gradually increased by activating individual cylinders 18 and skipping a predetermined number of engine cycles in between cylinder activations. Additionally, the ignition system 16 may initially be set with a large initial spark offset. The spark offset may be gradually decreased to increase torque production of the engine 20. As engine torque production increases, EMG 32 torque production is decreased. In addition, the AC compressor capacity may be increased as the engine torque production is increased.

The coordinated torque control continues until torque control is disabled. When torque control is disabled, control loops on step 302 until torque control is enabled.

Referring again to FIG. 2, in step 204 when control determines that the detected wheel slip is a positive wheel slip, control proceeds to step 214. In step 214, when traction control is enabled, control loops back to step 202. When traction control is disabled, control proceeds to step 216.

When traction control is disabled, and a positive wheel slip is detected, the operator is aggressively driving the vehicle and may be intentionally inducing positive wheel slip. In such case, the operator may not desire fuel efficiency functions to be performed. In step 216, fuel efficiency functions are disabled.

Fuel efficiency functions may include a deceleration fuel deactivation function and an idle stop function. The deceleration fuel deactivation function is generally implemented such that fuel delivery to the engine is deactivated during periods of deceleration. The idle stop function is generally implemented such that fuel delivery to the engine is deactivated while the vehicle is stopped.

Figure 4:
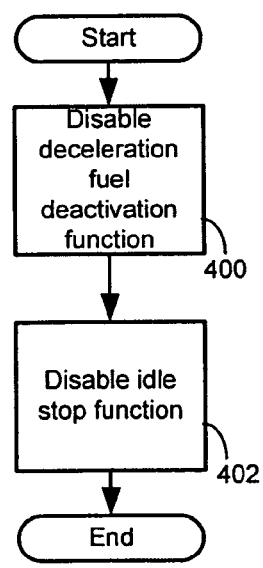
FIG. 4 is a flowchart illustrating steps performed to disable fuel efficiency functions.

Referring now to FIG. 4, and with continued reference to FIG. 2, steps for disabling fuel efficiency functions are illustrated. It is understood that the steps illustrated in FIG. 4 are encapsulated by step 216 of FIG. 2. In step 400, control disables the deceleration fuel deactivation function. In step 402, control disables the idle stop function. The fuel efficiency functions may be disabled by setting, or resetting, corresponding flags or signals.

Referring again to FIG. 2, after disabling fuel efficiency functions, control proceeds to step 218. In step 218, control determines whether a positive wheel slip persists. Control loops on step 218 while a positive wheel slip continues. When positive wheel slip terminates, control proceeds to step 220.

In step 220, control determines whether a reset period has expired. Control loops on steps 218 and 220 until the reset period expires. When the reset period expires without the detection of additional positive wheel slip, control proceeds to step 222. When additional positive wheel slip is detected prior to the expiration of the reset period, then control loops on step 218 until the positive wheel slip is no longer detected, and the reset period is restarted. In this way, fuel efficiency functions remain disabled until positive wheel slip has ceased for the duration of the reset period. The reset period may be a predetermined period. The reset period may also be based on the vehicle speed such that higher vehicle speeds require a shorter reset period.

Figure 5:
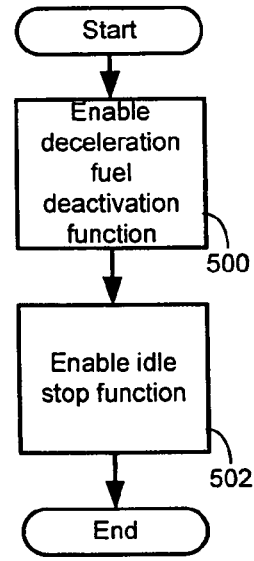
FIG. 5 is a flowchart illustrating steps performed to enable fuel efficiency functions.

In step 222, fuel efficiency functions are enabled. Referring now to FIG. 5, and with continued reference to FIG. 2, steps for enabling fuel efficiency functions are illustrated. It is understood that the steps illustrated in FIG. 5 are encapsulated by step 222 of FIG. 2. In step 500, control enables the deceleration fuel deactivation function. In step 502, control enables the idle stop function. Referring again to FIG. 2, after control enable fuel efficiency functions, control proceeds to step 202.

A vehicle equipped with the wheel slip control system of the present invention may also be equipped with an anti-lock braking system. In such case, the wheel slip control system may operate independent of the anti-lock braking system. The anti-lock braking system and the wheel slip control system may share wheel slip detection functions. With reference to FIG. 1, an anti-lock braking system may receive wheel slip detection signals from the SDM.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel slip control system for a vehicle, said wheel slip control system comprising:
wheel speed sensors that generate wheel speed signals; and
a control module that controls torque production of at least one of an engine and an electric motor and that detects a negative wheel slip based on said wheel speed signals when at least one of said engine and said electric motor are back driven;

wherein said control module increases torque production of at least one of said engine and said electric motor when said negative wheel slip is detected.

2. The wheel slip control system of claim 1, said vehicle having an air conditioner, wherein said control module regulates a compressor capacity of said air conditioner and decreases said compressor capacity when said negative wheel slip is detected.

3. The wheel slip control system of claim 1, said vehicle having an air conditioner, wherein said control module regulates a rotational speed of a compressor of said air conditioner and decreases said rotational speed when said negative wheel slip is detected.

4. The wheel slip control system of claim 1, said vehicle having a torque converter and a transmission, further comprising:
 a torque converter clutch slip sensor that generates a torque converter clutch slip signal; and
 an engine rotational speed sensor that generates an engine rotational speed signal;
 wherein said control module calculates axle torque based on said torque converter clutch slip signal, said engine rotational speed signal, and said wheel speed signals, and increases torque production of at least one of said engine and said electric motor when said calculated axle torque is negative.

5. The wheel slip control system of claim 4, said vehicle having an air conditioner compressor, wherein said control module calculates said axle torque based on one of an air conditioner compressor capacity and an air conditioner compressor rotational speed.

6. The wheel slip control system of claim 1, wherein said control module increases torque production of said engine by activating a first cylinder of said engine, waiting a predetermined number of engine cycles, and activating a second cylinder of said engine.

7. The wheel slip control system of claim 1, wherein said control module detects a positive wheel slip based on said wheel speed signals and disables at least one fuel efficiency function of said vehicle when said positive wheel slip is detected.

8. The wheel slip control system of claim 7, wherein said at least one fuel efficiency function comprises at least one of a deceleration fuel deactivation function and an idle stop function.

9. A wheel slip control system for a vehicle having an engine, said wheel slip control system comprising:
 wheel speed sensors that generate wheel speed signals; and
 a control module that controls torque production of said engine, that detects a negative wheel slip based on said wheel speed signals when said engine is back driven, and that calculates axle torque based on said wheel speed signals;
 wherein said control module increases torque production of said engine when said negative wheel slip is detected and when said calculated axle torque is negative.

10. The wheel slip control system of claim 9, wherein said control module increases torque production of said engine by activating a first cylinder of said engine, waiting a predetermined number of engine cycles, and activating a second cylinder of said engine.

11. The wheel slip control system of claim 9 wherein said control module increases torque production of said engine by decreasing a spark offset of an ignition system of said engine.

12. The wheel slip control system of claim 9 wherein said control module detects a positive wheel slip based on said wheel speed signals, and disables at least one fuel efficiency function of said vehicle when said positive wheel slip is detected.

13. The wheel slip control system of claim 12, wherein said at least one fuel efficiency function comprises at least one of a deceleration fuel deactivation function and an idle stop function.

14. A method for controlling wheel slip in a vehicle having an engine, said method comprising:
 detecting a negative wheel slip when said engine is back driven;
 calculating an axle torque;
 increasing torque production of said engine when said negative wheel slip is detected and when said calculated axle torque is negative.

15. The method of claim 14 further comprising:
 decreasing at least one of an air conditioner compressor capacity and an air conditioner compressor rotational speed when said negative wheel slip is detected and when said calculated axle torque is negative.

16. The method of claim 14, said vehicle having an electric motor coupled with an energy storage device, said method further comprising:
 recharging said energy storage device with current from said electric motor when said vehicle is decelerating; and
 decreasing said current when said negative wheel slip is detected and when said calculated axle torque is negative.

17. The method of claim 14, said vehicle having an electric motor, said method further comprising:
 increasing torque production of said electric motor when said negative wheel slip is detected and when said calculated axle torque is negative.

18. The method of claim 14, wherein said increasing torque production of said engine comprises activating fuel delivery to a first cylinder of said engine, waiting a predetermined number of engine cycles, and activating fuel delivery to a second cylinder of said engine.

19. The method of claim 14, wherein said increasing torque production of said engine comprises decreasing a spark offset of an ignition system of said engine.

20. The method of claim 14 further comprising:
 detecting a positive wheel slip; and
 disabling at least one of a deceleration fuel deactivation function and an idle stop fuel deactivation function when said positive wheel slip is detected.

* * * * *